(No Model.)
2 Sheets—Sheet 1.
J. T. BRADY.
DEVICE FOR ATTACHING FORCE PUMPS AND HOSE TO STRAINERS.
No. 597,259.
Patented Jan. 11, 1898.
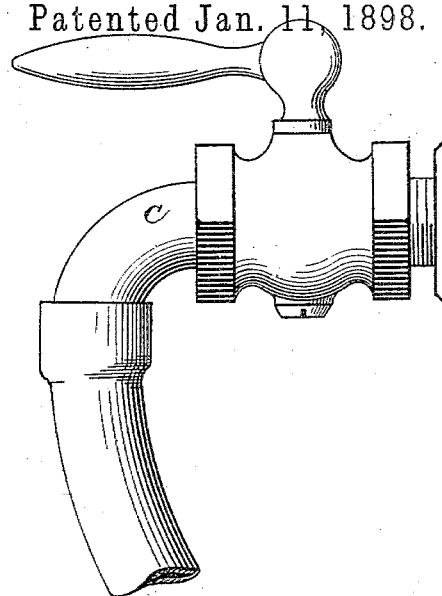
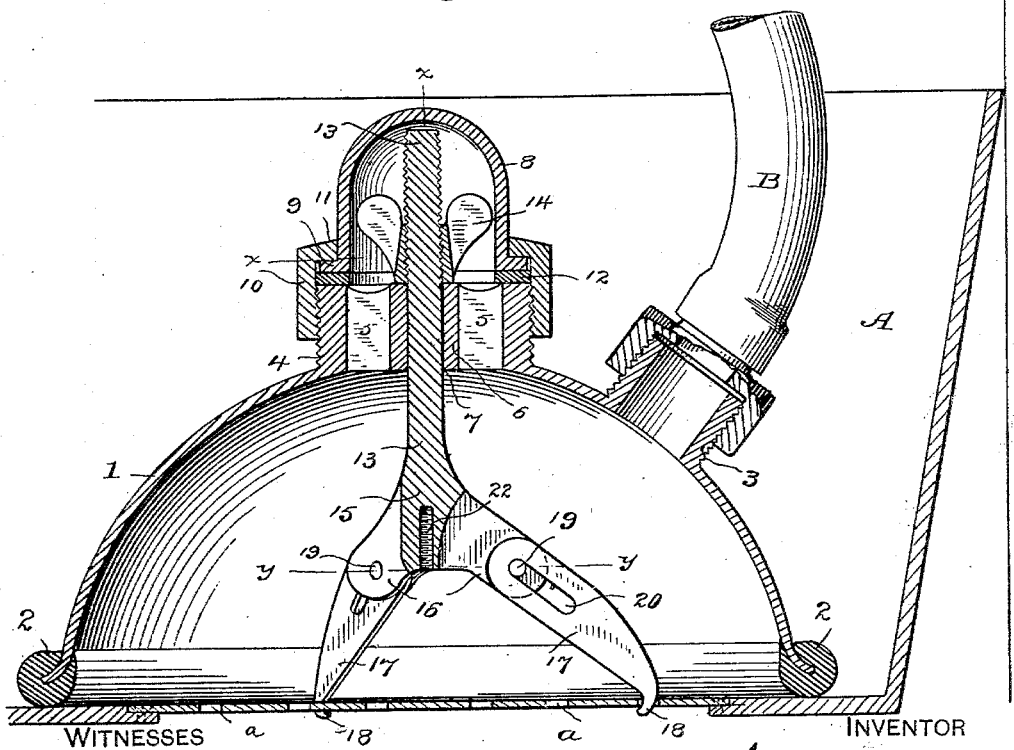
WITNESSES
H. A. Lamb
Susan V. Heley
INVENTOR
James T. Brady
By
A. M. Wooster
Atty.
THE NORRIS PETERS CO., PHOTO-LITHO., WASHINGTON, D. C.

(No Model.) 2 Sheets—Sheet 2.
J. T. BRADY.
DEVICE FOR ATTACHING FORCE PUMPS AND HOSE TO STRAINERS.
No. 597,259. Patented Jan. 11, 1898.
Fig. 2.
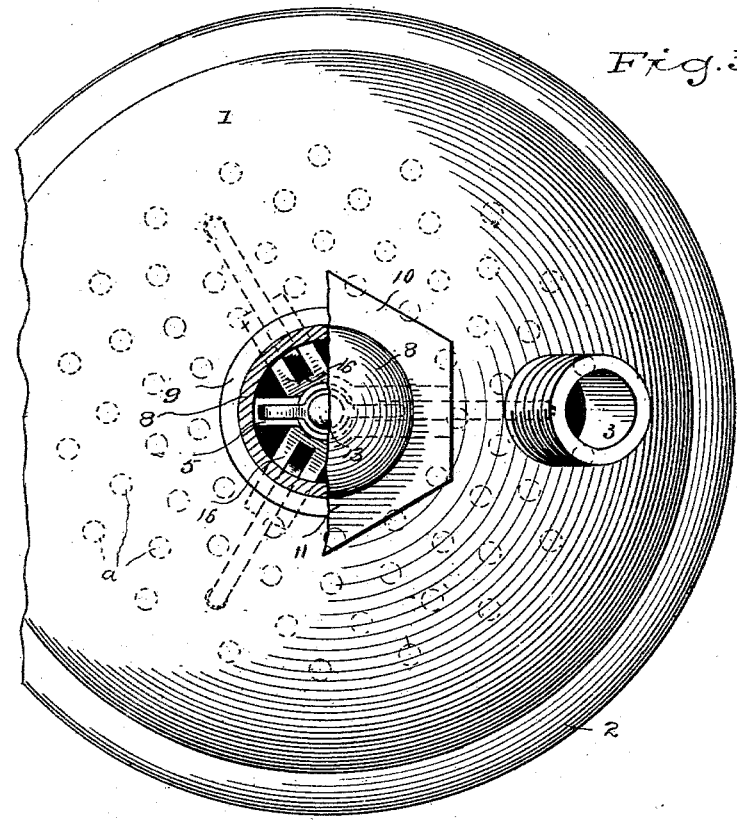
Fig. 3.
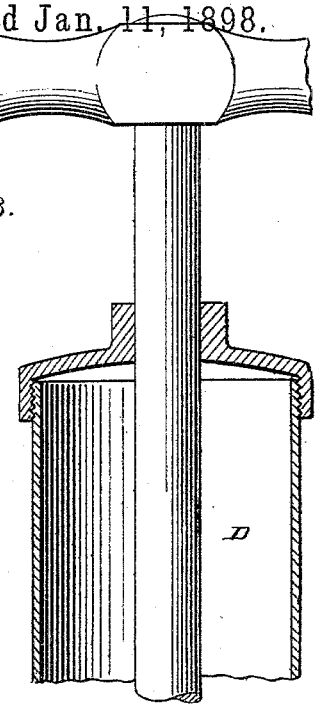
Fig. 4.
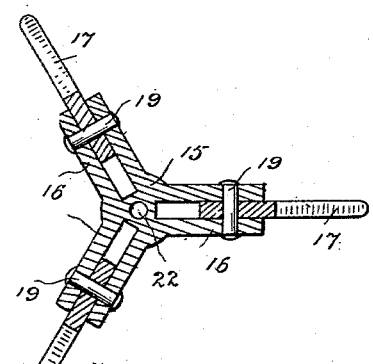
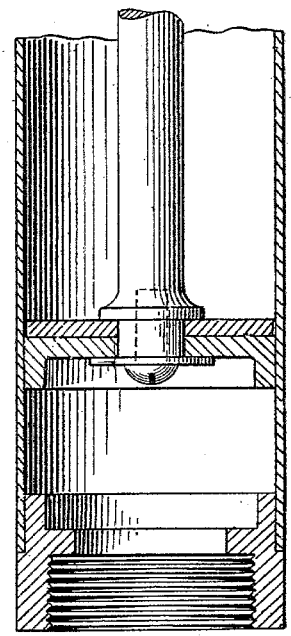
WITNESSES
H. A. Lamb
Susan V. Heley
INVENTOR
James T. Brady
By A. M. Wooster
Atty.
THE NORRIS PETERS CO., PHOTO-LITHO., WASHINGTON, D. C.

UNITED STATES PATENT OFFICE.

JAMES T. BRADY, OF BRIDGEPORT, CONNECTICUT.

DEVICE FOR ATTACHING FORCE-PUMPS AND HOSE TO STRAINERS.

SPECIFICATION forming part of Letters Patent No. 597,259, dated January 11, 1898.

Application filed March 6, 1897. Serial No. 626,286. (No model.)

*To all whom it may concern:*

Be it known that I, JAMES T. BRADY, a citizen of the United States, residing at Bridgeport, in the county of Fairfield and State of Connecticut, have invented certain new and useful Improvements in Devices for Attaching Force-Pumps and Hose to Strainers; and I do hereby declare the following to be a full, clear, and exact description of the invention, such as will enable others skilled in the art to which it appertains to make and use the same.

My invention has for its object to provide a device for attaching force-pumps and water-hose, either or both, to the strainers of sinks, basins, bath-tubs, &c., which shall be simple and inexpensive to produce, so as to be within the reach of all, and so simple in operation as not to require the services of a skilled workman.

With these ends in view I have devised the simple and novel construction of which the following description, in connection with the accompanying drawings, is a specification, reference-characters being used to indicate similar parts in all the views.

Figure 1 is a view, partly in elevation and partly in section, illustrating the application of my novel device to the strainer of a sink and showing connection made to an ordinary water-faucet; Fig. 1ᵃ, a detail view showing a special form of device for attachment to the strainer of a sink or bath-tub; Fig. 2, a plan view, partly in horizontal section, on the line $x\,x$ in Fig. 1, the faucet connection being removed; Fig. 3, a section of an ordinary force-pump which may be used in connection with my novel device; and Fig. 4 is a detail sectional view on the line $y\,y$ in Fig. 1.

1 denotes a bell which is adapted to cover the strainer of a sink, basin, or bath-tub, said bell being provided at its lower end with a rubber ring 2, which fits closely upon the bottom of the sink or other receptacle to which the device is attached.

A denotes a receptacle of any sort for water, in the present instance a sink, and $a$ a strainer. The bell is shown as provided with a threaded hub 3 for the attachment of a hose B, the other end of which I have shown in Fig. 1 as attached to an ordinary water-faucet C. When it is not desired to use hub 3—i. e., to make no connection with a water-faucet—said hub is closed by an ordinary screw-cap. (Not shown.)

4 denotes another threaded hub which is adapted to receive an ordinary force-pump D—for example, a simple form of pump like that illustrated in Fig. 3. Within hub 4 is a web 5, which supports a head 6, having a central opening 7. When this hub is not in use—i. e., when it is not desired to use a force-pump—it is covered by a dome-shaped cap 8, having a flange 9, which is locked in position by a nut 10, having a flange 11, which engages the flange of the cap and locks it to the hub, a packing-ring 12 being preferably placed between the cap and the top of the hub.

13 denotes a shank which passes freely through opening 7 in head 6 and is threaded at its upper end to receive a nut 14. At the lower end of shank 13 is a head 15, having ears 16, to which are loosely pivoted arms 17, having hooks 18, which are adapted to engage in holes in a strainer, as clearly shown in Fig. 1, (in connection with which see Figs. 2 and 4.) The pins 19, which secure the arms to the head, pass through slots 20 in the arms, so as to leave free play to the arms in attaching them to a strainer or to permit the use of a special form of hook in attaching the device to the strainer of a basin or bath-tub.

In attaching the device, for example, to the strainer of a sink, as in Fig. 1, the dome-shaped cap, nut 10, and the packing-ring are removed from the dome, the shank is passed upward through head 6, and hooks 18 are fixed in holes in the strainer, as clearly illustrated in Fig. 1. Nut 14 is then turned down on the threaded end of the shank until it bears firmly on head 6. By still turning the nut downward on the shank the operator draws the shank upward, locking the hooks firmly in the holes in the strainer and pressing ring 2 at the bottom of the bell firmly down upon the bottom of the sink, as is clearly illustrated in Fig. 1.

Supposing now that it is desired to use the ordinary water-pressure to clear out the pipe below the strainer, the operator attaches a hose B, as in Fig. 1, to hub 3, places the packing-ring upon the top of hub 4 and the dome-shaped cap upon the packing-ring, said dome-shaped cap being made high enough to inclose the shank readily, and then locks the cap to the hub by means of nut 10. The operator then turns on the water at the faucet and allows the water-pressure to clear the pipe below the strainer.

Should it be desired to use a force-pump in connection with the water-pressure, the operator leaves hose B attached, removes nut 10, the dome-shaped cap, and the packing-ring, and attaches a force-pump—for example, pump D—to hub 4, thus enabling him to add the power of the force-pump to the water-pressure from hose B. In case it is desired to use a style of force-pump having a special hose connection of its own and not adapted to be used in connection with a hose B, attached to a faucet, the hose is removed and either hub 3 or hub 4 is closed in the manner described and the force-pump is attached to the other hub, as has already been fully described.

Should it be desired to use the device in connection with the strainer of a bath-tub or basin which is usually below the escape-orifice of the basin, a special form of hook 21 (see Fig. 1ª) is used, which is engaged with the strainer and the threaded end of which is turned into a threaded socket 22 in head 15 at the lower end of the shank, the slots in arms 17 making it unnecessary to remove them from the head, the shank being rotated until the hook has firmly engaged the socket, after which the bell is placed in position, as already described, and the pipe below the strainer may be cleared out by water-pressure or by a force-pump, as already described.

Having thus described my invention, I claim—

1. A device of the character described comprising a bell adapted to cover a strainer and provided with a threaded hub 3 for the attachment of a water-hose, a threaded hub 4 for the attachment of a pump, said hub 4 having a web carrying a head 6 with a central opening, a shank passing through the web and threaded at its upper end and having at its lower end a head 15, arms having hooks at their lower ends adapted to engage the strainer and slots at their upper ends, pins passing through said slots and securing the arms to head 15 and a nut adapted to engage the threaded end of the shank and bear upon hub 6 whereby the bell is secured in position for use.

2. The combination with the bell having a hub 4 with a web 5 and head 6, of a shank adapted to pass through the hub and threaded at its upper end, arms having hooks adapted to engage a strainer and slots at their upper ends, pins passing through the slots by which the arms are secured to the lower end of the shank and a nut engaging the threaded end of the shank and bearing upon the head as and for the purpose set forth.

3. The combination with the bell having a head 3 for the attachment of a water-hose and a hub 4, said hub having a web with a head 6, of a shank adapted to pass through the hub and threaded at its upper end, arms having hooks adapted to engage a strainer and slots at their upper ends, pins passing through the slots by which the arms are secured to the lower end of the shank, a nut engaging the threaded end of the shank and bearing upon the head, a dome-shaped cap covering the upper end of the shank and a nut 10 by which said cap is secured to hub 4 and said hub is closed.

In testimony whereof I affix my signature in presence of two witnesses.

JAMES T. BRADY.

Witnesses:
A. M. WOOSTER,
SUSAN V. HELEY.